(12) United States Patent
Hom

(10) Patent No.: US 8,345,882 B2
(45) Date of Patent: Jan. 1, 2013

(54) METHOD FOR SAFEGUARDING DATA TRAFFIC BETWEEN A FIRST TERMINAL AND A FIRST NETWORK AND A SECOND TERMINAL AND A SECOND NETWORK

(75) Inventor: Günther Hom, München (DE)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 10/579,077

(22) PCT Filed: Nov. 10, 2004

(86) PCT No.: PCT/EP2004/052909
§ 371 (c)(1),
(2), (4) Date: May 11, 2006

(87) PCT Pub. No.: WO2005/046157
PCT Pub. Date: May 19, 2005

(65) Prior Publication Data
US 2007/0147618 A1    Jun. 28, 2007

(30) Foreign Application Priority Data

Nov. 11, 2003  (DE) .................................. 103 52 538
Dec. 16, 2003  (DE) .................................. 103 58 987

(51) Int. Cl.
*H04L 29/06* (2006.01)
(52) U.S. Cl. ......................................... 380/283; 380/33
(58) Field of Classification Search .................. None
See application file for complete search history.

(56) References Cited

U.S. PATENT DOCUMENTS

| 6,064,741 | A  | * | 5/2000 | Horn et al. .............. 380/285 |
| 6,868,282 | B2 | * | 3/2005 | Carlsson ................. 455/558 |
| 6,950,521 | B1 | * | 9/2005 | Marcovici et al. ........ 380/249 |
| 7,310,307 | B1 | * | 12/2007 | Das et al. .............. 370/229 |

(Continued)

FOREIGN PATENT DOCUMENTS

EP    1075155 A1 *  2/2001

(Continued)

OTHER PUBLICATIONS

"Digital Cellular Telecommunications System (Phase 2+) Security Related Network Functions (GSM 03.20 version 6.1.0 Release 1997)"; ETSI TS 100 929; Jul. 1999; pp. 1-71.

(Continued)

*Primary Examiner* — Nathan Flynn
*Assistant Examiner* — Michael R Vaughan
(74) *Attorney, Agent, or Firm* — Staas & Halsey LLP

(57) ABSTRACT

To safeguard data transmission, a first terminal communicates in a first network with the aid of at least one session key and a second terminal communicates in a second network with the aid of at least one session key. The first terminal is connected to the second terminal through a local interface. In the first terminal, at least one first session key is determined and at least one second session key is derived from the first session keys. At least one second session key is transmitted to the second terminal through the local interface by a safety protocol. The second terminal is authenticated to the second network by at least one second session key or by the key derived from the second session key(s) through an authentication protocol.

14 Claims, 1 Drawing Sheet

U.S. PATENT DOCUMENTS

| | | | |
|---|---|---|---|
| 7,738,411 B2* | 6/2010 | Koponen et al. | 370/315 |
| 8,060,139 B2* | 11/2011 | Yaqub et al. | 455/558 |
| 2002/0012433 A1* | 1/2002 | Haverinen et al. | 380/247 |
| 2002/0169958 A1* | 11/2002 | Nyman et al. | 713/168 |
| 2003/0120920 A1 | 6/2003 | Svensson | |
| 2004/0019786 A1* | 1/2004 | Zorn et al. | 713/168 |
| 2004/0142684 A1* | 7/2004 | Ratert et al. | 455/420 |
| 2004/0202145 A1* | 10/2004 | Lundin | 370/349 |
| 2004/0228491 A1* | 11/2004 | Wu | 380/272 |
| 2004/0268122 A1* | 12/2004 | Satarasinghe et al. | 713/159 |
| 2005/0021940 A1* | 1/2005 | Ma | 713/155 |
| 2005/0025091 A1* | 2/2005 | Patel et al. | 370/328 |
| 2005/0210251 A1* | 9/2005 | Nyberg et al. | 713/169 |
| 2006/0052085 A1* | 3/2006 | Rodriguez et al. | 455/411 |
| 2006/0104440 A1* | 5/2006 | Durand et al. | 380/44 |
| 2006/0154659 A1* | 7/2006 | Roter et al. | 455/422.1 |
| 2006/0288407 A1* | 12/2006 | Naslund et al. | 726/9 |
| 2007/0150608 A1* | 6/2007 | Randall et al. | 709/228 |

FOREIGN PATENT DOCUMENTS

| | | |
|---|---|---|
| KR | 2001-0112618 | 12/2001 |
| WO | 03/084265 | 10/2003 |

OTHER PUBLICATIONS

3rd Generation Partnership Project; Technical Specification Group Services and System Aspects; 3G Security; Security architecture (Release5); 3GPP TS 33.102 V5.3.0; 2003; pp. 1-61.

"3rd Generation Partnership Project; Technical Specification Group Services and System Aspects; 3G Security; Wireless Local Area Network (WLAN) Interworking Security Release 6"; 3GPP Draft Specification TS 33.234. V0.6.0; 2003, pp. 1-48.

"WWLAN UE Functional Split", 3GPP TSG-SA3 #29; S3-030365; Change Request 33.234; 2003, pp. 1-3.

"SIM Access via 'SIM Access Profile' and Bluetooth Link", 3GPP TSG SA WG3 Security—S3#29, S3-030436; 2003, pp. 1-7.

"WLAN-3G Interworking Security Requirements Relating to a Functional Split on the Terminal Side"; 3GPP TSG SA WG3 Security—S3#26; S3-020639; 2002, pp. 1-3.

J. Arkko, et al., "Extensible Authentication Protocol Method for 3rd Generation Authentication and Key Agreement (EAP-AKA)"; Network Working Group RFC 4187; Jan. 2006; pp. 1-79.

H. Haverinen et al.; Extensible Authentication Protocol Method for Global System for Mobile Communications (GSM); Subscriber Identity Modules (EAP-SIM); Network Working Group RFC 4186, Jan. 2006; pp. 1-92.

H. Krummel; Bluetooth SIM Access Profile (Draft), Version 0.95VD_d, Sep. 2002, pp. 1-55.

"GSM-Funkmodul Fürs Auto Ohne Eigene SIMS (Update)"; Heise Zeitschriften Verlag; dated Aug. 2003; printed from www.heise.de/mobil/newsticker/meldung/39577 on Jun. 26, 2006; 1 pg.

"Secure Hash Standard"; Federal Information Processing Standards (FIPS) Publication 180-1; Apr. 1995, 17 pages.

"Technical Report on (U)SIM Security Reuse by Peripheral Devices on Local Interfaces (Release 6)" (Draft); 3GPP TSG SA WG3 Security—S3#30; S3-030595; Oct. 2003, pp. 1-19.

International Search Report for International Application No. PCT/EP2004/052909; mailed May 13, 2005.

English Translation of Reasons for Rejection for JP-2006-538857; mailed Oct. 16, 2009.

Notice of Allowance for Korean Patent Application No. 10-2006-7011111; dated Oct. 27, 2011.

English Abstract of JP 5075598 A1, published Mar. 26, 1993.

English Abstract of JP 6-291362, published Oct. 18, 1994.

* cited by examiner

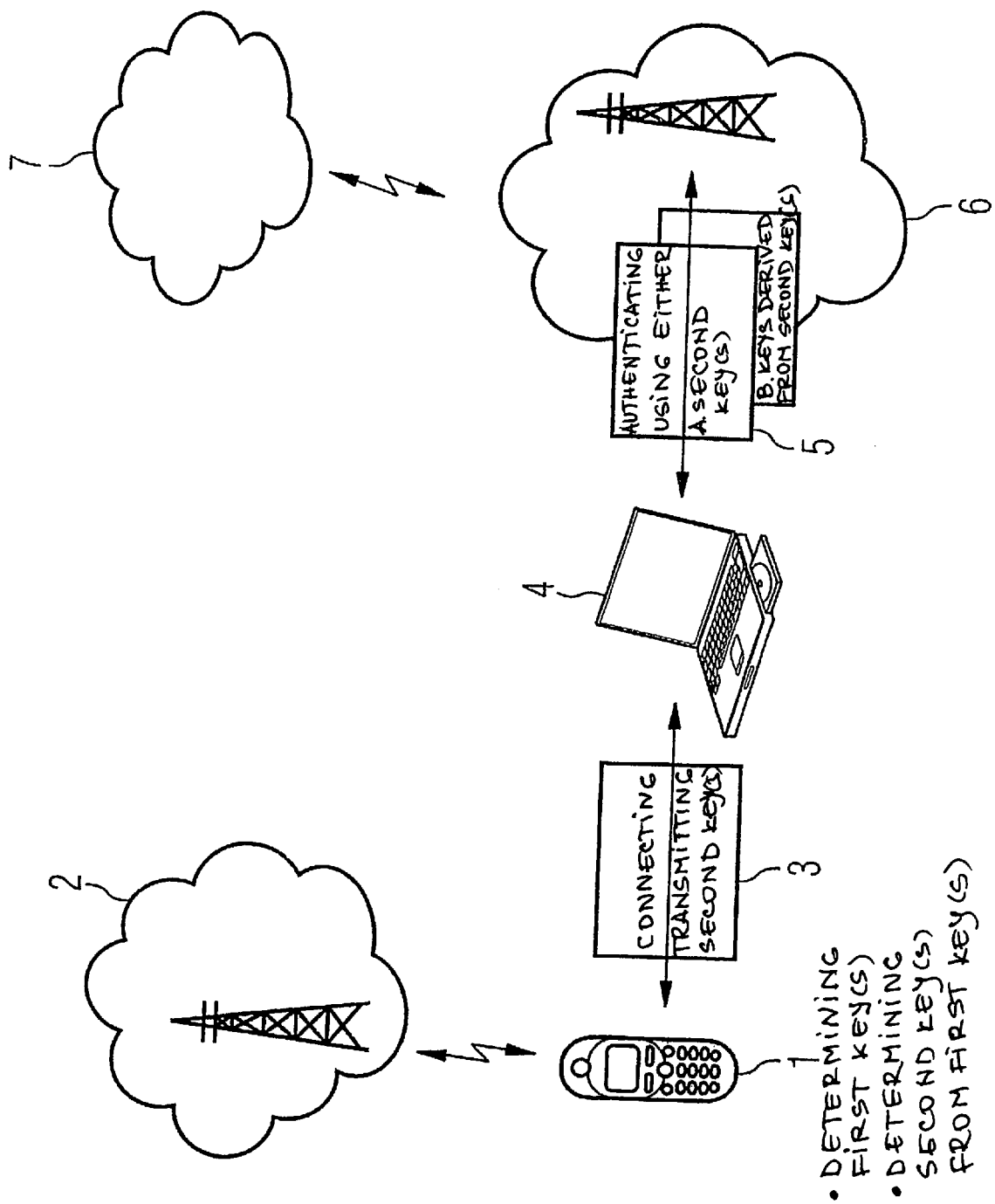

METHOD FOR SAFEGUARDING DATA TRAFFIC BETWEEN A FIRST TERMINAL AND A FIRST NETWORK AND A SECOND TERMINAL AND A SECOND NETWORK

CROSS REFERENCE TO RELATED APPLICATIONS

This application is based on and hereby claims priority to German Application No. 10352538.6 filed on Nov. 11, 2003 and German Application No. 10358987.2 filed on Dec. 16, 2003, the contents of which are hereby incorporated by reference.

BACKGROUND OF THE INVENTION

1. Field of the Invention

The invention relates to a method for safeguarding data traffic between a first terminal and a first network and a second terminal and a second network. The invention also relates to a corresponding first and a corresponding second terminal, with which such a method can be implemented.

2. Description of the Related Art

Users of mobile telephones today have to be able to access not just a mobile radio network but also further networks, e.g. the internet, via a suitable access network. In the case of internet access it is particularly desirable for the transmitted data to be displayed not on the mobile telephone but on a further terminal, e.g. a laptop.

Methods are known with which a first terminal in the form of a mobile telephone, containing a SIM or USIM module (SIM=Subscriber Identity Module; USIM=Universal Subscriber Identity Module), connects via a local interface to a second terminal in the form of a laptop, the laptop allowing access to a further network, e.g. a WLAN network and/or the internet. The second terminal is hereby authenticated to the further network via an authentication protocol, with keys being used in the protocol, which go back to the SIM or USIM module. Suitable authentication protocols that can be used are for example the following: EAP-SIM (EAP=Extensible Authentication Protocol; SIM=Subscriber Identity Module; see, H. Haverinen et al. "EAP SIM Authentication", internet draft, draft-haverinen-pppext-eap-sim-12, October 2003) or EAP-AKA (EAP=Extensible Authentication Protocol; AKA=Authentication Key Agreement; see, J. Arkko et al., "EAP AKA Authentication", internet draft, draft-arkko-pppext-eap-aka-11, October 2003). The protocol EAP-SIM is hereby used for GSM mobile telephones and the protocol EAP-AKA is used for UMTS mobile telephones.

The authentication protocols EAP-SIM and EAP-AKA require both communication with the network and involvement of the SIM or USIM module in the authentication. This means that both the second terminal and the first terminal are involved in the execution of the authentication protocol. An exchange of data is therefore required between the second terminal and the first terminal via a local interface, e.g. a Bluetooth interface. Authentication data is thereby transmitted via this interface by a suitable profile for the purposes of authentication. Bluetooth profiles in particular, e.g. the Bluetooth SIM Access Profile (see, "SIM access via 'SIM Access Profile' and Bluetooth link", contribution S3-030436 to the 3GPP meeting SA3#29, San Francisco, 15-18 Jul. 2003; revised text of version 0.95VD_d, attachment att2), are known as suitable profiles from the known art. First session keys, which are actually used for communication between the mobile telephone and the corresponding mobile radio network, are transmitted via the local interface. These first session keys are then used to calculate new session keys in the second terminal, with which new session keys the authentication operates via the authentication protocol. It can be problematic here for the first session keys to be known in the second terminal. This means that an attacker, who gains control of the second terminal, also has access to the first session keys and can impersonate the user of the first terminal, for example making calls at the user's expense in the first network.

SUMMARY OF THE INVENTION

An aspect of the invention is therefore to create a method for safeguarding data traffic between a first terminal and a first network and a second terminal and a second network that satisfies more stringent security requirements. The method is intended in particular to protect against the attack described above.

With this method a first terminal is used, which can communicate with the aid of one or more first session keys in a first network as is a second terminal, which can communicate with the aid of one or more second session keys in a second network. In the method the first terminal is connected to the second terminal via a local interface. The first session key(s) is/are determined in the first terminal and the second session key(s) is/are derived from the first session keys. The second session key(s) is/are transmitted via the local interface by a security protocol to the second terminal. The second terminal is finally authenticated to the second network via an authentication protocol with the aid of the second session key(s) and/or with the aid of keys derived from the second session key(s). The method is based on the idea that the first session key(s) is/are not available to the second terminal. Therefore functions that are actually executed by the second terminal are moved to the first terminal. In particular the second session key(s) is/are derived from the first session keys in the first terminal. Therefore an attacker, who gains control of the second terminal, is no longer able to access the first session keys and cannot therefore access the first network.

In a preferred variant the authentication protocol is configured such that the keys derived from the second session key(s) are generated as part of the protocol and used to protect the messages of the authentication protocol and/or to protect communication in the second network.

In one embodiment the first network is a GSM network and the first session key(s) is/are hereby generated in a SIM module on the first terminal. In this instance the authentication protocol is preferably the protocol EAP-SIM (EAP=Extensible Authentication Protocol; SIM=Subscriber Identity Module). In an alternative embodiment the first network is a UMTS network and the first session key(s) is/are generated in a USIM module (USIM=Universal Subscriber Identity Module) on the first terminal. In this instance the authentication protocol is preferably EAP-AKA (EAP=Extensible Authentication Protocol; AKA=Authentication Key Agreement).

The local interface between the first and second terminals is preferably configured via a wireless interface. A Bluetooth and/or infrared interface in particular is an option.

The second network, which communicates with the second terminal in the method, is preferably a local network, in particular a LAN and/or WLAN network. The local network can in turn be connected to further networks, e.g. the internet.

In a further preferred variant of the invention the security protocol, with which information is exchanged between the first and second terminals, is configured as follows:

a first signaling message from the second terminal is sent to the first terminal, the first signaling message initiating the derivation of the second session key(s) from the first session keys in the first terminal;

in response to the first signaling message a second signaling message is sent from the first terminal to the second terminal, with the second session key(s) being transmitted with the second signaling message.

The second session key(s) is/are hereby transmitted in a simple manner from the first terminal to the second terminal. In a preferred variant parameters from the authentication protocol are transmitted with the first signaling message. The security protocol is preferably an extended Bluetooth SIM Access Profile protocol, containing the first and second signaling messages. The precise specifications and requirements for such an extended protocol are defined in the special description.

In addition to a data traffic safeguarding method, the invention may be implemented in a terminal, which is configured such that it can be used as the first or second terminal in the above-described method. The first terminal preferably determines the first session key(s) and derives the second session key(s) from the first session keys.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 is a schematic diagram of an example of a scenario, in which a data traffic safeguarding method according to the invention may be used.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a first terminal in the form of a mobile telephone 1, which is connected via a local Bluetooth interface 3 to a second terminal 4 in the form of a laptop 4. The second terminal 4 is in turn connected via a further wireless interface 5 to a second network 6, which is a WLAN network in FIG. 1. An authentication protocol operates between the laptop 4 and the network 6 for authentication to the WLAN network. The WLAN network 6 is in turn connected to a further network 7, for example the internet. The mobile telephone 1 is also connected to a mobile radio network 2, for example a GSM or UMTS network, via an air interface. The mobile telephone is identified in the mobile radio network by an identity module, which is a SIM module in the case of GSM and a USIM module in the case of UMTS. One or more first session keys, which are generated in the identity module of the mobile telephone, are used to allow the mobile telephone to communicate with the mobile radio network. One or more second session keys are similarly used for communication between the laptop 4 and the WLAN network 6.

In the scenario in FIG. 1 it is intended that a user of the mobile telephone should be able to authenticate themselves to the WLAN network via the laptop 4 with the aid of the first session keys generated in the identity module of the mobile telephone. The second session keys are derived from the first session keys for this purpose. An attack, in which the attacker gains control of the laptop 4, is a problem here, if the first session keys are transmitted via the Bluetooth interface 3 to the laptop 4 and derived in the laptop. In this instance the attacker would gain knowledge of the first session keys and could then impersonate the user in the mobile radio network 2. To prevent such attacks, according to a preferred data safeguarding method, the second session keys are not derived in the laptop 4 but in the mobile telephone 1 from the first session keys. The derived second session keys are then transmitted via the Bluetooth interface 3 by a security protocol to the laptop, which uses these second session keys or further keys derived from the second session keys to carry out authentication to the WLAN network using the authentication protocol. The first session keys are therefore no longer stored in the laptop so that an attacker gaining control of the laptop is not able to set up a mobile radio connection using the first session keys.

The invention is described in detail below with reference to two exemplary embodiments. In the first exemplary embodiment the first terminal is a GSM mobile telephone with a SIM module and in the second exemplary embodiment it is a UMTS mobile telephone with a USIM module.

In the first exemplary embodiment the EAP-SIM protocol (see, Haverinen et al.) an authentication protocol for authentication to the WLAN network is used. It is assumed that the SIM module of the mobile telephone is only involved in a so-called full authentication (see, Haverinen et al., clause 3) and not a so-called re-authentication (see, Haverinen et al., clause 4.3). The exact message flow of the authentication process is described in clause 3 of Haverinen et al. (see in particular FIG. 1). The following is required for authentication:

The mobile telephone 1 receives from the laptop 4 the protocol identity (EAP-SIM), two or three GSM challenges RAND and the parameters "Identity", "NONCE_MT", "Version List" and "Selected Version". The parameters "Identity", "NONCE_MT", "Version List" and "Selected Version" are described in more detail in Haverinen et al. The mobile telephone forwards each of the received RANDs one after the other to its SIM module. The next RAND can only be forwarded to the SIM module, when the module has given its response to the previous RAND.

The following functions are executed for each RAND on the SIM module: Execution of the GSM algorithms A3/A8, as described in GSM Technical Specification GSM 03.20 (ETSI TS 100 929): "Digital cellular telecommunication system (Phase 2+); Security related network functions", European Telecommunications Standards Institute, July 1999, i.e. derivation of a response SRES and a GSM session key Kc. The parameters SRES and Kc are transferred from the SIM to the mobile telephone. Thus at the end of the communication with the SIM the mobile telephone has two or three responses SRES and two or three session keys Kc, depending on the number of RANDs received. The session keys Kc represent the first session keys.

The mobile telephone then calculates the EAP-SIM master key MK—as described in Haverinen et al., clause 4.6—according to the following formula (MK hereby represents a second session key):

MK=SHA1 (Identity|n*Kc|NONCE_MT|Version List|Selected Version) and sends MK and the responses SRES to the laptop.

In the above formula "|" means concatenation. Identity refers to the peer identity of the string without the zero characters at the end. It is the identity of the AT_IDENTITY attribute of the last EAP-Response/SIM/Start Packet or if no AT_IDENTITY was used, the identity of the EAP-Response/

Identity Packet. The identity string is used without change and includes the possible identity decoration. The notation n*Kc refers to the n concatenated Kc values. The Kc keys are used in the same sequence as the RAND challenges in the AT_RAND attribute. NONCE_MT refers to the NONCE_MT values (not the AT_NONCE_MT attribute, just the NONCE value). The "Version List" typically comprises 2-byte version numbers of the AT_VERSION_LIST in the same sequence as in the attribute. The "Selected Version" is a 2-byte version of AT_SELECTED_VERSION. The network byte order is used, just as in the attributes. The hash function SHA-1 is specified in Federal Information Processing Standard (FIPS) Publication 180-1, "Secure Hash Standard", National Institute of Standards and Technology, US Department of Commerce, Apr. 17, 1995. If a number of EAP/SIM/Start Loops are used in an EAP/SIM exchange, the parameters NONCE_MT, "Version List" and "Selected Version" from the last EAP/SIM/Start Loop are used and the earlier EAP/SIM/Start Loops are ignored.

The laptop then calculates all further keys from MK, in particular so-called session keys. The laptop also carries out the check "verifies AT_MAC" shown in FIG. 1 in clause 3 of Haverinen et al. The key derivation for calculating MK from the session keys Kc is sufficient to prevent the laptop being able to draw conclusions relating to the session keys Kc.

An extended Bluetooth SIM Access Profile is used to transmit the parameters required to calculate the master key in the mobile telephone 1. The message "TRANSFER_APDU_REQ" used in the existing SIM Access Profile is extended to include the parameters "AuthProt", "EAP-Id", "NONCE_MAT", "Version List" and "Selected Version". Transmission of the EAP-Id is optional, if the mobile telephone can derive the EAP-Id from its own data. Two or three GSM challenges RAND also have to be transmitted. Transmission of these challenges is already considered in "SIM access via 'SIM Access Profile' and Bluetooth link."

The parameters used in the extended Bluetooth SIM Access Profile are described in more detail below:

Parameter: AuthProt
This parameter indicates the authentication protocol used.
Length: 1 byte
Parameter ID: to be defined by the Bluetooth Special Interest Group (SIG) (not essential to the invention)
Parameter values: EAP-SIM value=0x01
Parameter: EAP-Id
This parameter contains the EAP identity of the user (permanent identity or pseudonym identity as set out in Haverinen et al., clause 4.6) used to derive the master key.
Length: variable
Parameter ID: to be defined by the Bluetooth Special Interest Group (SIG) (not essential to the invention)
Parameter values: Suitable coding of EAP identity (coding is not essential to the invention)
Parameter: "NONCE_MT"
This parameter contains the NONCE_MT value of the EAP peer (as set out in Haverinen et al., clause 4.6) used to derive the master key.
Length: 16 bytes
Parameter ID: to be defined by the Bluetooth Special Interest Group (SIG) (not essential to the invention)
Parameter values: Suitable coding of NONCE_MT (coding is not essential to the invention)
Parameter: "Version List"
This parameter contains the Version List (as set out in Haverinen et al., clause 4.6) used to derive the master key.
Length: 2 bytes
Parameter ID: to be defined by the Bluetooth Special Interest Group (SIG) (not essential to the invention)
Parameter values: Suitable coding of Version List (coding is not essential to the invention)
Parameter: "Selected Version"
This parameter contains the Selected Version of the EAP peer (as set out in Haverinen et al., clause 4.6) used to derive the master key.
Length: 2 bytes
Parameter ID: to be defined by the Bluetooth Special Interest Group (SIG) (not essential to the invention)
Parameter values: Suitable coding of Selected Version (coding is not essential to the invention)

The message "TRANSFER_APDU_RESP" is contained in the current specification of the SIM Access Profile (see "SIM access via 'SIM Access Profile' and Bluetooth link," clause 5.2). This message should be extended to include the parameter "MK". Two or three GSM responses SRES also have to be transmitted. Transmission of the GSM responses is already considered in "SIM access via 'SIM Access Profile' and Bluetooth link."

Parameter: MK
This parameter contains the master key calculated in the mobile telephone according to Haverinen et al., clause 4.6.
Length: 20 bytes
Parameter ID: to be defined by the Bluetooth Special Interest Group (SIG) (not essential to the invention)
Parameter values: Suitable coding of the master key MK (coding is not essential to the invention)

When using a UMTS mobile telephone the EAP-AKA protocol it is known to use the authentication protocol for authentication in the WLAN network 6 (see, J. Arkko et al.). Authentication here takes place as in J. Arkko et al., clause 3 (see the figure in particular). It is assumed that the USIM module and the mobile telephone are only involved in a full authentication (see document [2], clause 3) and not a re-authentication (see J. Arkko et al., clause 4.2). The mobile telephone executes the following functions, the parameters below being described in more detail in J. Arkko et al.:

The mobile telephone receives the protocol identity (EAP-AKA), the AKA challenge RAND|AUTN and the parameter "Identity" from the laptop and forwards RAND and AUTN to the USIM module. The parameter "Identity" here refers to the identity used by the user in EAP, as described in more detail in J. Arkko et al., clause 4.5.

The following functions are executed on the USIM:

Execution of the UMTS algorithms f1 to f5 and f5*, as described in 3GPP Technical Specification 3GPP TS 33.102 V5.3.0: "Technical Specification Group Services and System Aspects; 3G Security; Security Architecture (release 5)", 3rd Generation Partnership Project, September 2003, in particular verification of AUTN and MAC and derivation of the response RES and the AKA session keys CK and IK, which represent the first session keys. The parameters RES, CK and IK are transferred from the USIM module to the mobile telephone.

The mobile telephone then calculates the EAP-AKA master key MK—as described in J. Arkko et al., clause 4.5— according to the following formula (MK hereby represents a second session key):

MK=SHA1(Identity|IK|CK)

and sends MK and RES to the laptop.

In the above formula "|" means concatenation. Identity refers to the peer identity string without the zero characters at the end. This identity is the identity of the AT_IDENTITY attribute of the last EAP-Response/AKA-Identity Packet or, if the AT_IDENTITY was not used, the identity of the EAP- Response/Identity Packet. The identity string is used without change and only includes the possible identity decoration. The hash function SHA-1 is specified in FIPS Publication 180-1.

The laptop then calculates all further keys from MK, in particular the session keys mentioned in clause 3 of J. Arkko et al. The key derivation for calculating MK from CK and IK is sufficient to prevent the laptop being able to draw conclusions relating to CK and IK.

To transmit the parameters required to calculate the master key in the mobile telephone, an extended Bluetooth SIM Access protocol is used, with which the parameters are transmitted via the local Bluetooth interface. The parameters used in the extended Bluetooth SIM Access Profile are described in more detail below:

The message "TRANSFER_APDU_REQ" is contained in the current specification of the SIM Access Profile, see "SIM access via 'SIM Access Profile' and Bluetooth link," clause 5.2. This message should be extended to include the parameters "AuthProt" and "EAP-Id". The transmission of EAP-Id is optional, if the mobile telephone can derive EAP-Id from its own data. The AKA challenge RAND|AUTN also has to be transmitted. Transmission of the AKA challenge is already considered in "SIM access via 'SIM Access Profile' and Bluetooth link."

Parameter: AuthProt
This parameter indicates the authentication protocol used.
Length: 1 byte
Parameter ID: to be defined by the Bluetooth Special Interest Group (SIG) (not essential to the invention)
Parameter values: EAP-AKA: value=0x00
Parameter: EAP-Id
This parameter contains the EAP identity of the user (permanent identity or pseudonym identity as set out in J. Arkko et al., clause 4.5) used to derive the master key.
Length: variable
Parameter ID: to be defined by the Bluetooth Special Interest Group (SIG) (not essential to the invention)
Parameter values: Suitable coding of EAP identity (coding is not essential to the invention)

The message "TRANSFER_APDU_RESP" is contained in the current specification of the SIM Access Profile, see "SIM access via 'SIM Access Profile' and Bluetooth link," clause 5.2. This message should be extended to include the parameter "MK". The AKA response RES also has to be transmitted. Transmission of the AKA response is already considered in "SIM access via 'SIM Access Profile' and Bluetooth link."

Parameter: MK
This parameter contains the master key calculated in the mobile telephone according to J. Arkko et al., clause 4.5.
Length: 20 bytes
Parameter ID: to be defined by the Bluetooth Special Interest Group (SIG) (not essential to the invention)
Parameter values: Suitable coding of the master key MK (coding is not essential to the invention).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for safeguarding data traffic between a first terminal communicating with a first network via a first interface, and a second terminal communicating with a second network via a second interface, comprising:
    connecting the first terminal to the second terminal via a local interface, the first terminal communicating in the first network using at least one first session key to encrypt/decrypt first messages and the second terminal communicating in the second network using at least one second session key to encrypt/decrypt second messages;
    determining the at least one first session key in the first terminal;
    deriving the at least one second session key from the at least one first session key in the first terminal, wherein the at least one second session key is not derived by the second terminal and the at least one first session key is not transmitted to the second terminal;
    transmitting the at least one second session key to the second terminal via the local interface using a security protocol;
    authenticating the second terminal to the second network using an authentication protocol based on at least one of the at least one second session key and keys derived from the at least one second session key.

2. A method according to claim 1, wherein the keys derived from the at least one second session key are generated as part of the authentication protocol and used to protect at least one of the messages of the authentication protocol and communication in the second network.

3. A method according to claim 2, wherein the first network is a Global System for Mobile Communication network and the at least one first session key is generated in a Subscriber Identity Module on the first terminal.

4. A method according to claim 3, wherein the authentication protocol is used in an Extensible Authentication Protocol-Subscriber Identity Module.

5. A method according to claim 2, wherein the first network is a Universal Mobile Telecommunications System network and the at least one first session key is generated in a Universal Subscriber Identity Module on the first terminal.

6. A method according to claim 5, wherein the authentication protocol is an Extensible Authentication Protocol-Authentication Key Agreement.

7. A method according to claim 6, wherein the local interface is a wireless interface using at least one of Bluetooth and infrared communication.

8. A method according to claim 7, wherein part of the second network is a local area network and includes wireless communication.

9. A method according to claim 8, wherein the security protocol includes
    in sending a first signaling message from the second terminal to the first terminal, derivation of the at least one second session key from the at least one first session key is initiated with the first signaling message in the first terminal;
    in sending a second signaling message from the first terminal to the second terminal in response to the first signaling message, the at least one second session key is transmitted with the second signaling message.

10. A method according to claim 9, wherein parameters from the authentication protocol are transmitted with the first signaling message.

11. A method according to claim 10, wherein the security protocol is an extended Bluetooth SIM Access Profile protocol, containing the first and second signaling messages.

12. A terminal configured such that it can be used as the first terminal in the method recited in claim 1.

13. A terminal according to claim 12, the terminal having means to determine the at least one first session key and means for deriving the at least one second session key from the at least one first session key.

14. A terminal configured such that it can be used as the second terminal in the method recited in claim 1.

* * * * *

UNITED STATES PATENT AND TRADEMARK OFFICE
CERTIFICATE OF CORRECTION

PATENT NO. : 8,345,882 B2  
APPLICATION NO. : 10/579077  
DATED : January 1, 2013  
INVENTOR(S) : Günther Horn Page 1 of 1

It is certified that error appears in the above-identified patent and that said Letters Patent is hereby corrected as shown below:

Title Page, Item [75], Col. 1 (Inventor); Line 1, Delete "Günther Hom" and insert -- Günther Horn --, therefor.

Signed and Sealed this  
Twenty-sixth Day of March, 2013

Teresa Stanek Rea  
*Acting Director of the United States Patent and Trademark Office*